United States Patent
Cheng

(10) Patent No.: US 10,732,845 B2
(45) Date of Patent: Aug. 4, 2020

(54) DATA SEARCH METHOD, MEMORY STORAGE APPARATUS, AND MEMORY CONTROL CIRCUIT UNIT

(71) Applicant: PHISON ELECTRONICS CORP., Miaoli (TW)

(72) Inventor: Yu-Hong Cheng, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 476 days.

(21) Appl. No.: 15/065,859

(22) Filed: Mar. 10, 2016

(65) Prior Publication Data

US 2017/0206005 A1 Jul. 20, 2017

(30) Foreign Application Priority Data

Jan. 14, 2016 (TW) .............................. 105101099 A

(51) Int. Cl.
*G06F 3/06* (2006.01)
(52) U.S. Cl.
CPC .............. *G06F 3/061* (2013.01); *G06F 3/064* (2013.01); *G06F 3/0632* (2013.01);
(Continued)
(58) Field of Classification Search
CPC ...... G06F 3/061; G06F 3/0679; G06F 3/0659; G06F 3/0632; G06F 3/0644
(Continued)

(56) References Cited

U.S. PATENT DOCUMENTS 7,657,696 B2 * 2/2010 Su .......................... G11C 16/20
711/103
8,386,738 B1 * 2/2013 Sun ..................... G06F 13/1694
711/103
(Continued)

FOREIGN PATENT DOCUMENTS

CN 1869915 11/2006

OTHER PUBLICATIONS

Micron, TN-29-19 An Introduction to NAND Flash and How to Design It in to Your Next Product, 2006 [retrieved from internet Nov. 20, 2019][<URL:https://user.eng.umd.edu/~blj/CS-590.26/micron-tn2919.pdf >] (Year: 2006).*

(Continued)

*Primary Examiner* — David Yi
*Assistant Examiner* — Nicholas A. Paperno
(74) *Attorney, Agent, or Firm* — JCIPRNET

(57) ABSTRACT

A data search method, a memory storage apparatus, and a memory control circuit unit are provided. The method includes: detecting a boot signal; sending a first read command sequence based on a first grouping rule corresponding to grouping a first number of physical sub-units into one physical unit and then determining whether a system information of a rewritable non-volatile memory module is read; sending a second read command sequence based on a second grouping rule corresponding to grouping a second number of physical sub-units into one physical unit if the system information is not read; and operating the rewritable non-volatile memory module based on the system information. Therefore, the efficiency of searching for the system information from the rewritable non-volatile memory module can be improved.

21 Claims, 10 Drawing Sheets

(52) U.S. Cl.
CPC .......... *G06F 3/0644* (2013.01); *G06F 3/0659* (2013.01); *G06F 3/0679* (2013.01)

(58) Field of Classification Search
USPC ....................................................... 713/1–2
See application file for complete search history.

(56) References Cited

U.S. PATENT DOCUMENTS

| | | | |
|---|---|---|---|
| 2005/0027962 A1* | 2/2005 | Zhang | G06F 12/1036 711/207 |
| 2006/0161758 A1* | 7/2006 | Bradford | G06F 12/1036 711/202 |
| 2007/0239977 A1* | 10/2007 | Wu | G06F 9/4403 713/2 |
| 2008/0008001 A1* | 1/2008 | Kuroyanagi | G06F 11/1068 365/185.11 |
| 2010/0262891 A1* | 10/2010 | Catalano | G06F 11/1068 714/773 |
| 2011/0060897 A1* | 3/2011 | Toelkes | G06F 9/4418 713/2 |
| 2011/0145484 A1* | 6/2011 | Agarwal | G11C 16/20 711/103 |
| 2012/0191960 A1* | 7/2012 | Piwonka | G06F 9/441 713/2 |
| 2012/0210116 A1* | 8/2012 | Smith | G06F 9/4401 713/2 |
| 2012/0284497 A1* | 11/2012 | Hsin | G06F 9/4401 713/2 |
| 2014/0019741 A1* | 1/2014 | Nautiyal | G06F 9/4408 713/2 |

OTHER PUBLICATIONS

"Office Action of China Counterpart Application," dated Dec. 12, 2019, p. 1-p. 11.

\* cited by examiner

DATA SEARCH METHOD, MEMORY STORAGE APPARATUS, AND MEMORY CONTROL CIRCUIT UNIT

CROSS-REFERENCE TO RELATED APPLICATION

This application claims the priority benefit of Taiwan application serial no. 105101099, filed on Jan. 14, 2016. The entirety of the above-mentioned patent application is hereby incorporated by reference herein and made a part of this specification.

BACKGROUND

Technology Field

The disclosure relates to a memory management technique, and more particularly, to a data search method, a memory storage apparatus, and a memory control circuit unit.

Description of Related Art

Due to the rapid development of digital cameras, cellular phones, and MP3 players in recent years, consumer demand for storage media has rapidly increased as well. Since a rewritable non-volatile memory module (such as a flash memory) has characteristics such as data non-volatility, power-saving, small size, and no mechanical structures, the rewritable non-volatile memory module is very suitable to be built into the various portable multimedia apparatuses provided above.

In general, the memory controller of a memory storage apparatus manages the rewritable non-volatile memory module therein based on physical blocks, such as storing or reading data. Based on different manufacturing processes or management strategies, each of the physical blocks in the rewritable non-volatile memory module may contain a preset number of physical pages such as 64, 128, or 256. In general, management information relating to the preset number is stored in a read-only memory (ROM) of the memory controller. When the memory storage apparatus is booted, the management information is read from the ROM and used as a basis for operating the memory storage apparatus. In case that the management information is not stored in the ROM of the memory controller, the memory controller needs to find the desired management data from the rewritable non-volatile memory module when the memory storage apparatus is booted. However, if the efficiency of the used search mechanism is low, the boot time of the memory storage apparatus may be longer.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the disclosure provides a data search method, a memory storage apparatus, and a memory control circuit unit capable of increasing the efficiency of searching for system information from the rewritable non-volatile memory module.

An exemplary embodiment of the disclosure provides a data search method for accessing a rewritable non-volatile memory module, wherein the rewritable non-volatile memory module includes a plurality of physical sub-units, and the data search method includes: detecting a boot signal; sending a first read command sequence based on a first grouping rule after the boot signal is detected, wherein the first grouping rule is a grouping rule corresponding to grouping a first number of physical sub-units among the physical sub-units into one physical unit; determining whether a system information of the rewritable non-volatile memory module is read through the first read command sequence; sending a second read command sequence based on a second grouping rule in the case that the system information of the rewritable non-volatile memory module is not read through the first read command sequence, wherein the second grouping rule is a grouping rule corresponding to grouping a second number of physical sub-units among the physical sub-units into one physical unit, wherein the first number is different from the second number; and operating the rewritable non-volatile memory module based on the system information after the system information of the rewritable non-volatile memory module is read.

Another exemplary embodiment of the disclosure provides a memory storage apparatus including a connection interface unit, a rewritable non-volatile memory module, and a memory control circuit unit. The connection interface unit is configured to be coupled to a host system. The rewritable non-volatile memory module includes a plurality of physical sub-units. The memory control circuit unit is coupled to the connection interface unit and the rewritable non-volatile memory module, the memory control circuit unit is configured to detect a boot signal, and after the boot signal is detected, the memory control circuit unit is further configured to send a first read command sequence based on a first grouping rule, wherein the first grouping rule is a grouping rule corresponding to grouping a first number of physical sub-units among the physical sub-units into one physical unit, the memory control circuit unit is further configured to determine whether a system information of the rewritable non-volatile memory module is read through the first read command sequence, the memory control circuit unit is further configured to send a second read command sequence based on a second grouping rule in the case that the system information of the rewritable non-volatile memory module is not read through the first read command sequence, wherein the second grouping rule is a grouping rule corresponding to grouping a second number of physical sub-units among the physical sub-units into one physical unit, wherein the first number is different from the second number, the memory control circuit unit is further configured to operate the rewritable non-volatile memory module based on the system information after the system information of the rewritable non-volatile memory module is read.

Another exemplary embodiment of the disclosure provides a memory control circuit unit configured to control a rewritable non-volatile memory module, and the memory control circuit unit includes a host interface, a memory interface, and a memory management circuit. The host interface is configured to be coupled to a host system. The memory interface is configured to be coupled to a rewritable non-volatile memory module, wherein the rewritable non-volatile memory module includes a plurality of physical sub-units. The memory management circuit is coupled to the host interface and the memory interface and is configured to detect a boot signal, and after the boot signal is detected, the memory management circuit is further configured to send a first read command sequence based on a first grouping rule, wherein the first grouping rule is a grouping rule corresponding to grouping a first number of physical sub-units among the physical sub-units into one physical unit, the memory management circuit is further configured to determine whether a system information of the rewritable non-volatile memory module is read through the first read command sequence, the memory management circuit is further configured to send a second read command sequence based on a second grouping rule in the case that the system information of the rewritable non-volatile memory module is not read through the first read command sequence, the second grouping rule is a grouping rule corresponding to grouping a second number of physical sub-units among the physical sub-units into one physical unit, wherein the first number is different from the second number, the memory management circuit is further configured to operate the rewritable non-volatile memory module based on the system information after the system information of the rewritable non-volatile memory module is read.

Based on the above, after the boot signal is detected, in the disclosure, corresponding read command sequences can be sent in order based on different grouping rules. In particular, each of the grouping rules corresponds to a specific number of physical sub-units grouped to the same physical unit under the management of the rewritable non-volatile memory module. For instance, the number of physical sub-units contained in one physical unit is different corresponding to different grouping rules. Therefore, the efficiency of searching for the system information from the rewritable non-volatile memory module can be increased.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
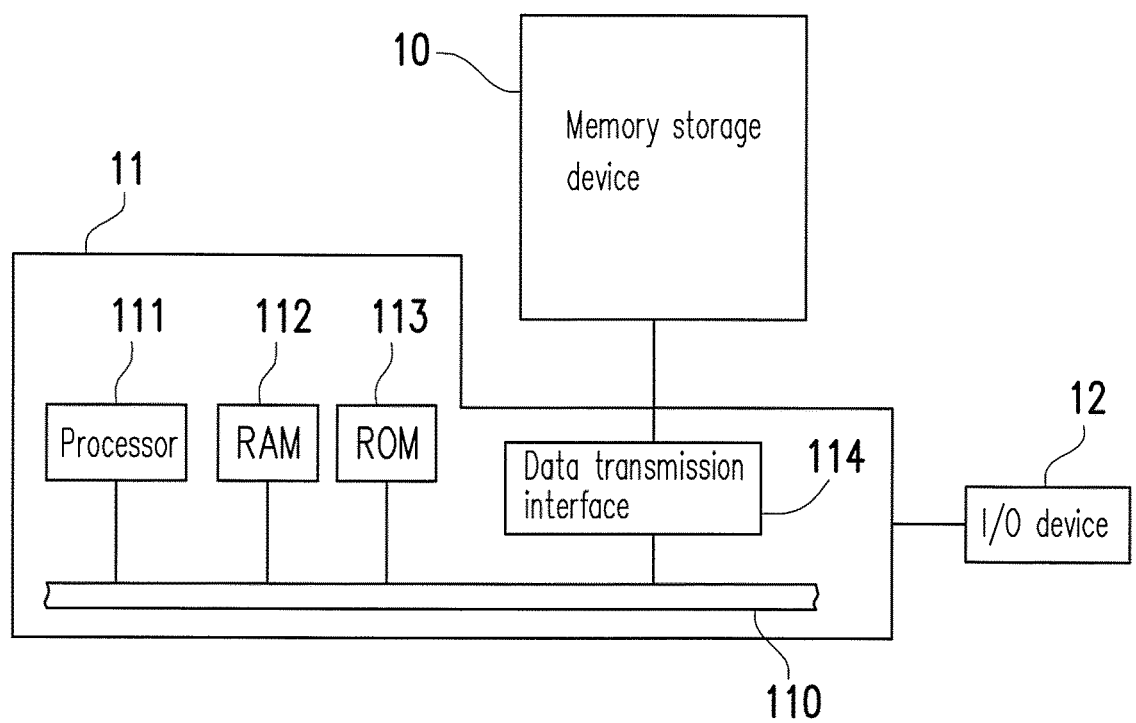
FIG. 1 is a schematic of a host system, a memory storage apparatus, and an input/output (I/O) apparatus illustrated according to an exemplary embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage apparatus (also referred to as a memory storage system) includes a rewritable non-volatile memory module and a controller (also referred to as a control circuit). The memory storage apparatus is generally used with a host system, such that the host system can write data into the memory storage apparatus or read data from the memory storage apparatus.

FIG. 1 is a schematic of a host system, a memory storage apparatus, and an input/output (I/O) apparatus illustrated according to an exemplary embodiment of the disclosure.

Figure 2:
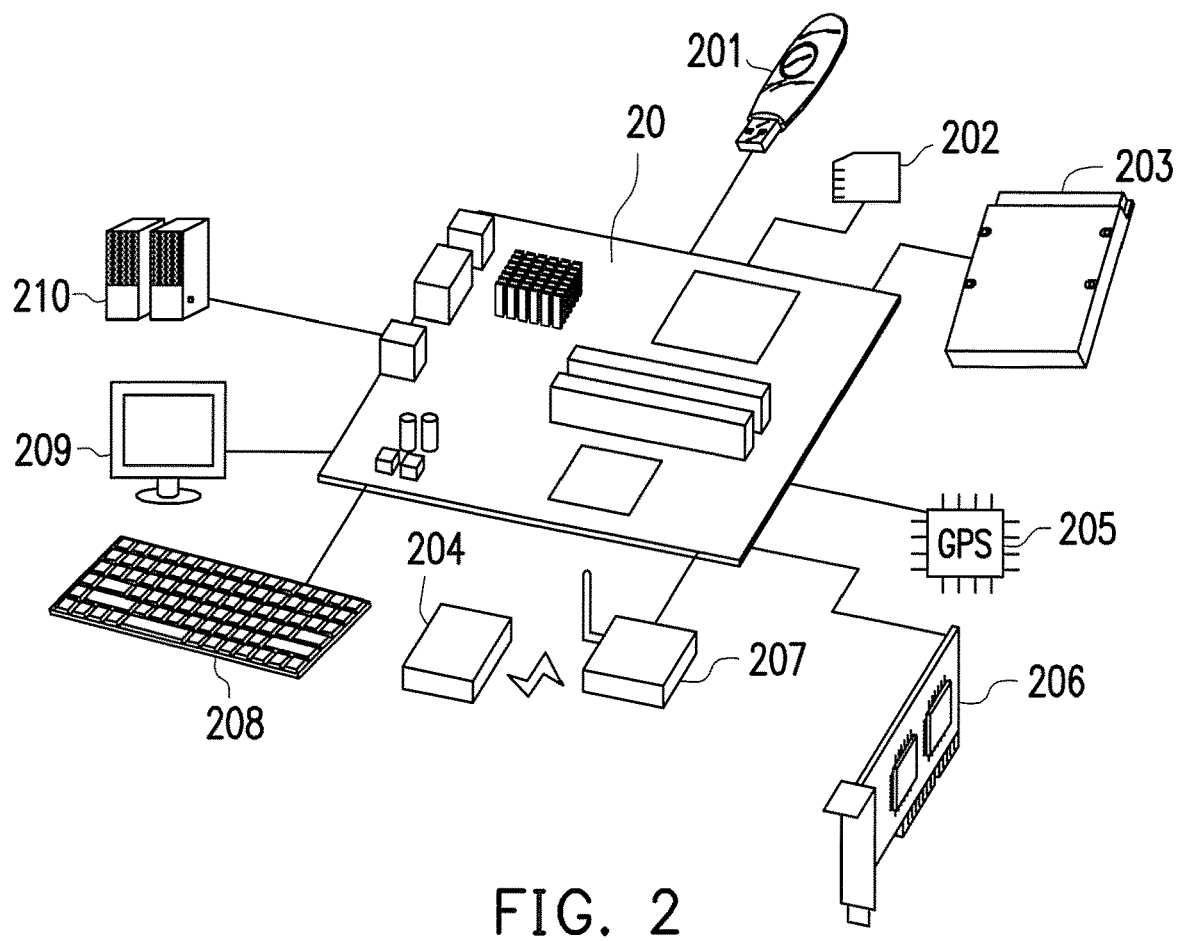
FIG. 2 is a schematic of a host system, a memory storage apparatus, and an I/O apparatus illustrated according to another exemplary embodiment of the disclosure.

FIG. 2 is a schematic of a host system, a memory storage apparatus, and an I/O apparatus illustrated according to another exemplary embodiment of the disclosure.

Referring to FIG. 1 and FIG. 2, a host system 11 generally includes a processor 111, a random access memory (RAM) 112, a read-only memory (ROM) 113, and a data transmission interface 114. The processor 111, the RAM 112, the ROM 113, and the data transmission interface 114 are all coupled to a system bus 110.

In the present exemplary embodiment, the host system 11 is coupled to the memory storage apparatus 10 through the data transmission interface 114. For instance, the host system 11 can store data in the memory storage apparatus 10 or read data from the memory storage apparatus 10 through the data transmission interface 114. Moreover, the host system 11 is coupled to the I/O apparatus 12 through the system bus 110. For instance, the host system 11 can send an output signal to the I/O apparatus 12 or receive an input signal from the I/O apparatus 12 through the system bus 110.

In the present exemplary embodiment, the processor 111, the RAM 112, the ROM 113, and the data transmission interface 114 can be disposed on a motherboard 20 of the host system 11. The quantity of the data transmission interface 114 can be one or a plurality. The motherboard 20 can be coupled to the memory storage apparatus 10 in a wired or wireless method through the data transmission interface 114. The memory storage apparatus 10 can be, for instance, a flash drive 201, a memory card 202, a solid state drive (SSD) 203, or a wireless memory storage apparatus 204. The wireless memory storage apparatus 204 can be, for instance, a memory storage apparatus based on various wireless communication techniques such as a near-field communication (NFC) memory storage apparatus, a wireless fax (WiFi) memory storage apparatus, a bluetooth memory storage apparatus, or a low-power bluetooth memory storage apparatus (such as iBeacon). Moreover, the motherboard 20 can also be coupled to various I/O apparatuses such as a global positioning system (GPS) module 205, a network interface card 206, a wireless transmission apparatus 207, a keyboard 208, a screen 209, or a speaker 210 through the system bus 110. For instance, in an exemplary embodiment, the motherboard 20 can access the wireless memory storage apparatus 204 through the wireless transmission apparatus 207.

Figure 3:
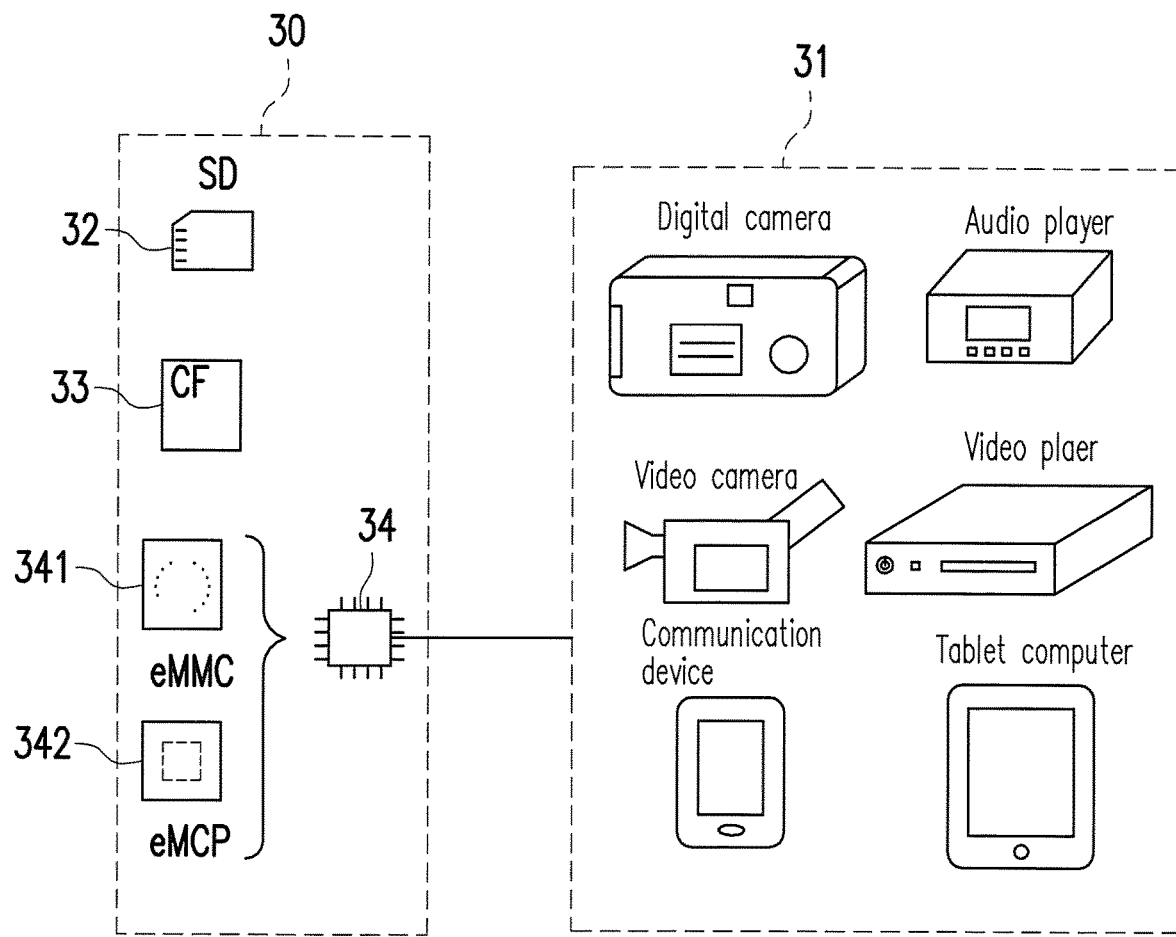
FIG. 3 is a schematic of a host system and a memory storage apparatus illustrated according to another exemplary embodiment of the disclosure.

In an exemplary embodiment, the host system is any system that can substantially be used with the memory storage apparatus for storing data. Although in the above exemplary embodiments, the host system is exemplified by a computer system, FIG. 3 is a schematic of a host system and a memory storage apparatus illustrated according to another exemplary embodiment of the disclosure. Referring to FIG. 3, in another exemplary embodiment, the host system 31 can also be a system such as a digital camera, a video camera, a communication apparatus, an audio player, a video player, or a tablet computer, and the memory storage apparatus 30 can be various non-volatile memory storage apparatuses used thereby such as an secure digital (SD) card 32, a compact flash (CF) card 33, or an embedded storage apparatus 34. The embedded storage apparatus 34 includes various types of embedded storage apparatuses for which a memory module is directly coupled on the substrate of the host system, such as an embedded multimedia card (eMMC) 341 and/or an embedded multi-chip package (eMCP) 342.

Figure 4:
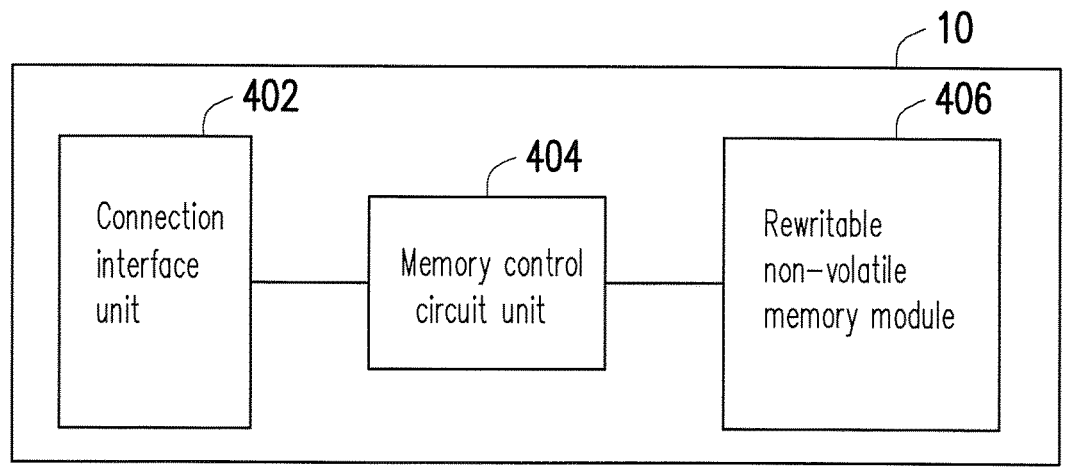
FIG. 4 is a schematic block diagram of a memory storage apparatus illustrated according to an exemplary embodiment of the disclosure.

FIG. 4 is a schematic block diagram of a memory storage apparatus illustrated according to an exemplary embodiment of the disclosure.

Referring to FIG. 4, the memory storage apparatus 10 includes a connection interface unit 402, a memory control circuit unit 404, and a rewritable non-volatile memory module 406.

In the present exemplary embodiment, the connection interface unit 402 is compatible with the serial advanced technology attachment (SATA) standard.

However, it should be understood that, the disclosure is not limited thereto, and the connection interface unit 402 can also satisfy the parallel advanced technology attachment (PATA) standard, Institute of Electrical and Electronic Engineers (IEEE) 1394 standard, peripheral component interconnect express (PCI express) interface standard, universal serial bus (USB) standard, SD interface standard, ultra high speed-I (UHS-I) interface standard, ultra high speed-II (UHS-II) interface standard, memory stick (MS) interface standard, multi-chip package interface standard, MMC interface standard, eMMC interface standard, universal flash storage (UFS) interface standard, eMCP interface standard, CF interface standard, integrated device electronics (IDE) interface standard, or other suitable standards. The connection interface unit 402 can be sealed in a chip with the memory control circuit unit 404. Alternatively, the connection interface unit 402 may also be disposed outside of a chip containing the memory control circuit unit 404.

The memory control circuit unit 404 is configured to execute a plurality of logic gates or control commands implemented in a hardware form or in a firmware form. The memory control circuit unit 404 also performs data operations such as writing, reading, and erasing of data in the rewritable non-volatile memory storage module 406 according to the commands of the host system 11.

The rewritable non-volatile memory module 406 is coupled to the memory control circuit unit 404 and is configured to store data written by the host system 11. The rewritable non-volatile memory module 406 can be a single-level cell (SLC) NAND-type flash memory module (i.e., a flash memory module for which one memory cell can store 1 bit), a multi-level cell (MLC) NAND-type flash memory module (i.e., a flash memory module for which one memory cell can store 2 bits), a triple-level cell (TLC) NAND-type flash memory module (i.e., a flash memory module for which one memory cell can store 3 bits), other flash memory modules, or other memory modules having the same characteristics.

Each of the memory cells in the rewritable non-volatile memory module 406 stores one or a plurality of bits via the change in voltage (also referred to as threshold voltage hereinafter). Specifically, a charge trapping layer is disposed between the control gate and the channel of each of the memory cells. By applying a write voltage to the control gate, the number of electrons of the charge-trapping layer can be changed, and therefore the threshold voltage of the memory cells can be changed. The process of changing the threshold voltage is also referred to as "writing data into memory cells" or "programming memory cells". As the threshold voltage is changed, each of the memory cells in the rewritable non-volatile memory module 406 has a plurality of storage statuses. Which storage status one memory cell belongs to can be determined through applying a read voltage, so as to obtain one or a plurality of bits stored by the memory cell.

Figure 5:
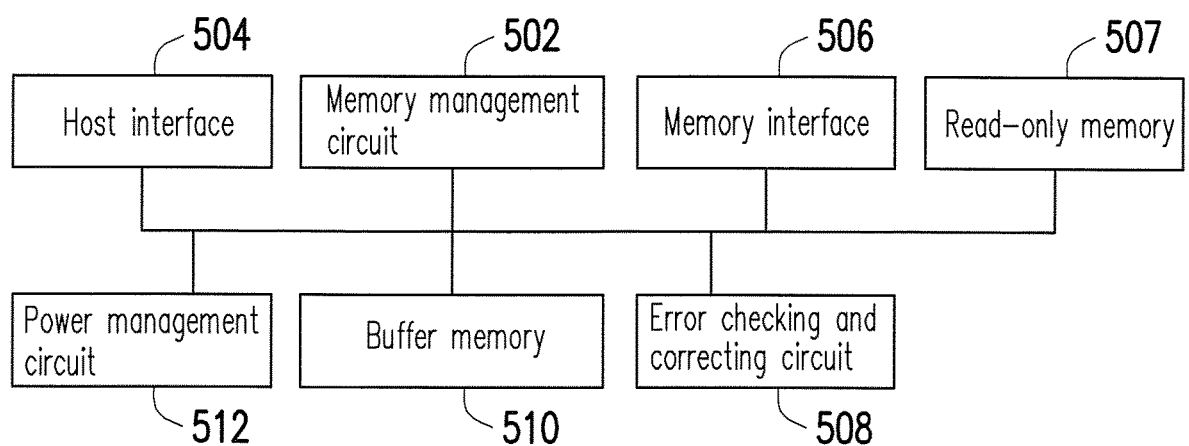
FIG. 5 is a schematic block diagram of a memory control circuit unit illustrated according to an exemplary embodiment of the disclosure.

FIG. 5 is a schematic block diagram of a memory control circuit unit illustrated according to an exemplary embodiment of the disclosure.

Referring to FIG. 5, the memory control circuit unit 404 includes a memory management circuit 502, a host interface 504, a memory interface 506, and a ROM 507.

The memory management circuit 502 is configured to control the overall operation of the memory control circuit unit 404. Specifically, the memory management circuit 502 has a plurality of control commands. During the operation of the memory storage apparatus 10, the control commands are executed to perform various data operations such as writing, reading, and erasing. In the following, descriptions relating to the operation of the memory management circuit 502 are equivalent to the descriptions of the operation of the memory control circuit unit 404.

In the present exemplary embodiment, the control commands of the memory management circuit 502 are implemented in a firmware form. For instance, the memory management circuit 502 has a microprocessor unit (not illustrated) and a ROM (not illustrated), and the control commands are burned into the ROM. During operation of the memory storage apparatus 10, the control commands are executed by the microprocessor unit to perform operations such as writing, reading, and erasing data.

In another exemplary embodiment, the control commands of the memory management circuit 502 may also be stored in the form of program codes in a specific region (for instance, the system area in a memory module exclusively configured to store system data) of the rewritable non-volatile memory module 406. Moreover, the memory management circuit 502 has a microprocessor unit (not shown), a ROM (not shown), and a RAM (not shown). In particular, the ROM has a boot code, and when the memory control circuit unit 404 is enabled, the microprocessor unit first executes the boot code to load the control commands stored in the rewritable non-volatile memory module 406 into the RAM of the memory management circuit 502. Then, the microprocessor unit runs the control commands to perform operations such as writing, reading, and erasing data.

Further, in another exemplary embodiment, the control commands of the memory management circuit 502 can also be implemented in a hardware form. For instance, the memory management circuit 502 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage the memory cells or groups thereof in the rewritable non-volatile memory module 406. The memory write circuit is configured to issue a write command sequence to the rewritable non-volatile memory module 406 to write data into the rewritable non-volatile memory module 406. The memory read circuit is configured to issue a read command sequence to the rewritable non-volatile memory module 406 to read data from the rewritable non-volatile memory module 406. The memory erase circuit is configured to issue an erase command sequence to the rewritable non-volatile memory module 406 to erase data from the rewritable non-volatile memory module 406. The data processing circuit is configured to process data to be written into the rewritable non-volatile memory module 406 and data read from the rewritable non-volatile memory module 406. The write command sequence, the read command sequence, and the erase command sequence can independently include one or a plurality of program codes or command codes and be configured to instruct the rewritable non-volatile memory module 406 to execute corresponding operations such as writing, reading, and erasing. In an exemplary embodiment, the memory management circuit 502 can also issue other types of command sequences to the rewritable non-volatile memory module 406 to instruct the execution of corresponding operations.

The host interface 504 is coupled to the memory management circuit 502 and is configured to receive and identify commands and data sent by the host system 11. In other words, the commands and data sent by the host system 11 are sent to the memory management circuit 502 through the host interface 504. In the present exemplary embodiment, the host interface 504 is compatible with the SATA standard. However, it should be understood that the disclosure is not limited thereto, and the host interface 504 can also be compatible with the PATA standard, IEEE 1394 standard, PCI Express standard, USB standard, SD standard, UHS-I standard, UHS-II standard, MS standard, MMC standard, eMMC standard, UFS standard, CF standard, IDE standard, or other suitable standards for data transmission.

The memory interface 506 is coupled to the memory management circuit 502 and is configured to access the rewritable non-volatile memory module 406. In other words, data to be written into the rewritable non-volatile memory module 406 is converted to a format acceptable to the rewritable non-volatile memory module 406 through the memory interface 506. Specifically, if the memory management circuit 502 is to access the rewritable non-volatile memory module 406, then the memory interface 506 sends a corresponding command sequence. For instance, the command sequences can include a write command sequence instructing data writing, a read command sequence instructing data reading, an erase command sequence instructing data erasing, and other command sequences configured to instruct various memory operations (such as changing read voltage level or executing garbage collection process). The command sequences are generated by, for instance, the memory management circuit 502 and sent to the rewritable non-volatile memory module 406 through the memory interface 506. The command sequences can include one or a plurality of signals or data on a bus. The signals or data can include a command code or a program code. For instance, information such as read identification code or memory address is included in a read command sequence.

The ROM 507 is coupled to the memory management circuit 502 and configured to store boot information. For instance, the boot information includes a boot code. When the memory storage apparatus 10 is booted, the memory management circuit 502 reads the boot information from the ROM 507 to execute a boot process. In an exemplary embodiment, the ROM 507 can also be disposed inside the memory management circuit 502. In the present exemplary embodiment, the ROM 507 is the only storage medium in the memory control circuit unit 404 for which stored data is not lost after power is turned off, but the disclosure is not limited thereto.

In an exemplary embodiment, the memory control circuit unit 404 further includes an error checking and correcting circuit 508, a buffer memory 510, and a power management circuit 512.

The error checking and correcting circuit 508 is coupled to the memory management circuit 502 and is configured to execute an error checking and correcting process to ensure the correctness of data. Specifically, when the memory management circuit 502 receives a write command from the host system 11, the error checking and correcting circuit 508 generates a corresponding error correcting code (ECC) and/or an error detecting code (EDC) for data corresponding to the write command, and the memory management circuit 502 writes the data corresponding to the write command and the corresponding ECC and/or EDC into the rewritable non-volatile memory module 406. Next, when reading data from the rewritable non-volatile memory module 406, the memory management circuit 502 also reads the ECC and/or the EDC corresponding to the data, and the error checking and correcting circuit 508 executes an error checking and correcting process on the read data based on the ECC and/or the EDC.

The buffer memory 510 is coupled to the memory management circuit 502 and is configured to temporarily store data and commands from the host system 11 or data from the rewritable non-volatile memory module 406. The power management circuit 512 is coupled to the memory management circuit 502 and is configured to control the power of the memory storage apparatus 10.

Figure 6:
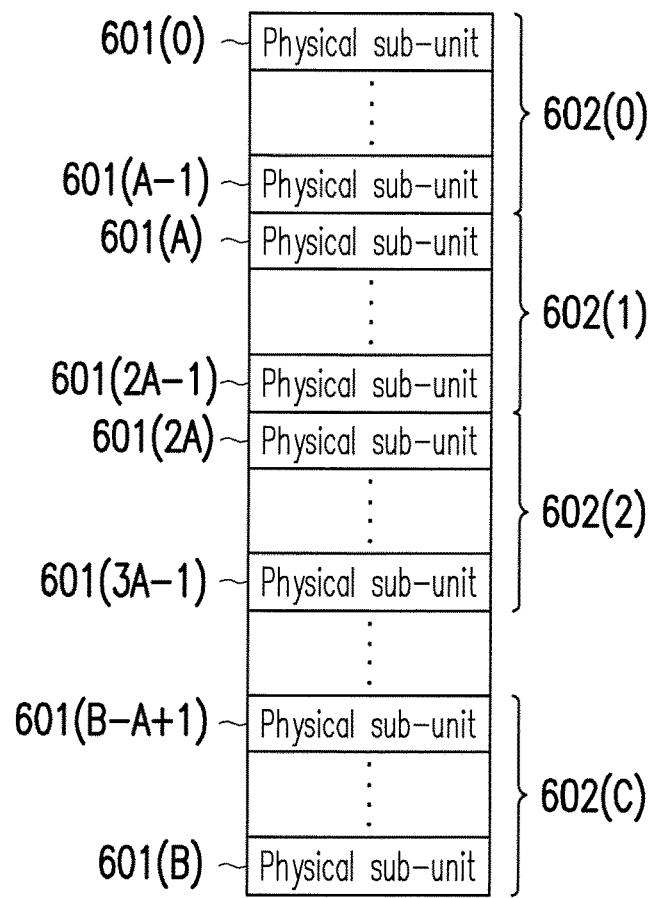
FIG. 6 is a schematic of the management of a rewritable non-volatile memory module illustrated according to an exemplary embodiment of the disclosure.

FIG. 6 is a schematic of the management of a rewritable non-volatile memory module illustrated according to an exemplary embodiment of the disclosure. It should be understood that, the description for the management of the rewritable non-volatile memory module 406 using terms such as "grouping" is a logical concept, and the circuit elements in the rewritable non-volatile memory module 406 are not actually moved.

Referring to FIG. 6, before the rewritable non-volatile memory module 10 leaves the factory, the memory cells in the rewritable non-volatile memory module 406 are grouped into a plurality of physical sub-units 601(0)-601(B), and the physical sub-units 601(0)-601(B) are further grouped into a plurality of physical units 602(0)-602(C). In particular, each of the physical units among the physical units 602(0)-602(C) contains an A number of physical sub-units, and A is a positive integer. For instance, the physical unit 602(0) includes physical sub-units 601(0)-601(A−1), the physical unit 602(1) includes physical sub-units 601(A)-601(2A−1), and the physical unit 602(2) includes physical sub-units 601(2A)-601(3A−1). Similarly, the physical unit 602(C) includes physical sub-units 601(B−A+1)-601(B). After the memory storage apparatus 10 leaves the factory, the memory management circuit 502 can operate the rewritable non-volatile memory module 406 according to the physical sub-units 601(0)-601(B) and the physical units 602(0)-602(C).

In an exemplary embodiment, each of the physical sub-units 601(0)-601(B) refers to one physical programming unit, and each of the physical units 602(0)-602(C) refers to one physical erasing unit. In particular, the physical programming unit is the smallest unit of programming. That is, the physical programming unit is the smallest unit of data writing. For instance, the physical programming unit is a physical page or a physical sector. If the physical programming unit is a physical page, then the physical programming units generally include a data bit area and a redundant bit area. The data bit area contains a plurality of physical sectors configured to store user data, and the redundant bit area is configured to store system data (such as an ECC). For instance, the data bit area contains 32 physical sectors, and the size of one physical sector is 512 bytes (B). However, in other exemplary embodiments, the data bit area can also contain 8, 16, or a greater or lesser number of physical sectors, and the size of each of the physical sectors can also be greater or smaller. Moreover, the physical erasing unit is the smallest unit of erasing. That is, each of the physical erasing units contains the smallest number of memory cells erased together. For instance, the physical erasing unit is a physical block. However, in another exemplary embodiment, one physical sub-unit can also be formed by any number of memory cells, and may not refer to one physical programming unit; moreover, one physical unit can also be formed by any number of physical sub-units, and may not refer to one physical erasing unit.

In the present exemplary embodiment, the system information for operating the rewritable non-volatile memory module 406 is not stored in the ROM 507, but is stored in one specific region in the rewritable non-volatile memory module 406. For instance, the system information contains information on how the physical sub-units 601(0)-601(B) are grouped.

In an exemplary embodiment, when the memory storage apparatus 10 leaves the factory, the system information is initially stored in the first physical sub-unit (such as the physical sub-unit 601(0)) of the rewritable non-volatile memory module 406 to facilitate access by the memory management circuit 502. However, the specific region in the rewritable non-volatile memory module 10 configured to store the system information may be changed with the use of the memory storage apparatus 10. For instance, as damage caused by the usage of the memory storage apparatus 10 is increased, a portion of the physical units in the rewritable non-volatile memory module 406 may be damaged. When the physical unit originally storing the system information are damaged, the system information is then moved to other physical units for storage. For instance, the system information is moved from the damaged first physical units to a first physical sub-units of an undamaged second physical units. Thereafter, when the memory storage apparatus 10 is rebooted, the memory management circuit 502 needs to search for the above system information from the rewritable non-volatile memory module 406 again.

In an exemplary embodiment, out of consideration that currently the total number of physical sub-units contained in one physical unit may be a multiple of 64 (such as 64, 128, 512, 1024), the memory management circuit 502 searches for the above system information from the rewritable non-volatile memory module 406 in a skipping manner by using 64 physical sub-units as one search unit. For instance, the memory management circuit 502 first attempts to read data stored in a first physical sub-unit (such as the physical sub-unit 601(0)) in the rewritable non-volatile memory module 406, since the above system information has the highest probability of being stored in this physical sub-unit. If the above system information cannot be read from the first physical sub-unit (such as the physical sub-unit 601(0)) in the rewritable non-volatile memory module 406, then the memory management circuit 502 reads the 65th physical sub-unit (such as the physical sub-unit 601(64)) in the rewritable non-volatile memory module 406. If the above system information still cannot be read from the 65th physical sub-unit (such as the physical sub-unit 601(64)) in the rewritable non-volatile memory module 406, then the memory management circuit 502 reads the 129th, 193rd, and 257th physical sub-units in the rewritable non-volatile memory module 406 until the above system information is found.

In an exemplary embodiment, if the above system information is not stored in the first physical sub-unit (such as the physical sub-unit 601(0)) in the rewritable non-volatile memory module 406, the above system information has a greater chance of being stored in a first physical sub-unit of a certain physical unit. Therefore, according to the above search mechanism, if each of the physical units in the rewritable non-volatile memory module 406 actually contains 64 physical sub-units, then the read operation executed each time can read the first physical sub-unit in any one of the physical units; if each of the physical units in the rewritable non-volatile memory module 406 actually contains 128 physical sub-units, then the first physical sub-unit of a next physical unit can be read by consecutively executing the read operation twice; however, if each of the physical units in the rewritable non-volatile memory module 406 actually contains 1024 or more physical sub-units, then the first physical sub-unit of a next physical unit can only be read by consecutively executing the read operation at least 16 times. In other words, when the total number of physical sub-units contained in one physical unit is greater, the search efficiency for the above system information is reduced, such that more time is needed to complete the boot process of the memory storage apparatus 10.

In the present exemplary embodiment, after the memory storage apparatus 10 is booted, the memory management circuit 502 executes a search process to search for the above system information from the rewritable non-volatile memory module 406. In the search process, the memory management circuit 502 sends corresponding read command sequences to the rewritable non-volatile memory module 406 based on different grouping rules, so as to attempt to continuously read the above system information from physical units corresponding to different grouping rules.

In an exemplary embodiment, in the case that the designer knows in advance that the ROM 507 does not store the above system information, the memory management circuit 502 can be set to automatically execute the above search process when a boot signal is detected. Alternatively, in another exemplary embodiment, the memory management circuit 502 can also be set to automatically determine whether the ROM 507 stores the above system information when the boot signal is detected. If the ROM 507 already stores the above system information (for instance, the memory management circuit 502 can directly read the above system information from the ROM 507), then the memory management circuit 502 directly operates the rewritable non-volatile memory module 406 according to the system information. Otherwise, if the ROM 507 does not store the above system information (for instance, the memory management circuit 502 cannot directly read the above system information from the ROM 507), then the memory management circuit 502 executes the above search process.

In an exemplary embodiment, the memory management circuit 502 can learn which grouping rule is used for grouping the physical sub-units of the rewritable non-volatile memory module 406 as default according to the above system information. For instance, the memory management circuit 502 can obtain the value of A in the exemplary embodiment of FIG. 6; alternatively, the memory management circuit 502 can further learn the values of B (i.e., the total number of physical sub-units in the rewritable non-volatile memory module 406) and/or C (i.e., the total number of physical units in the rewritable non-volatile memory module 406) in the exemplary embodiment of FIG. 6.

In an exemplary embodiment, the above system information can also contain other information beneficial to the management or the operation of the rewritable non-volatile memory module 406, such as the usage status of the physical units. For instance, the usage status of the physical units can include information such as which physical units are damaged, which physical units do not store valid data, an erase count of the physical units, a write count of the physical units, a read count of the physical units, or various management tables.

For ease of explanation, in the following exemplary embodiments, the physical sub-units 601(0)-601(B) in the rewritable non-volatile memory module 406 are assumed to be actually grouped according to one of a first grouping rule, a second grouping rule, a third grouping rule, a fourth grouping rule, and a fifth grouping rule. In particular, the first grouping rule is a grouping rule corresponding to grouping 64 physical sub-units into one physical unit, the second grouping rule is a grouping rule corresponding to grouping 128 physical sub-units into one physical unit, the third grouping rule is a grouping rule corresponding to grouping 256 physical sub-units into one physical unit, the fourth grouping rule is a grouping rule corresponding to grouping 512 physical sub-units into one physical unit, and the fifth grouping rule is a grouping rule corresponding to grouping 1024 physical sub-units into one physical unit. In other words, each physical unit conforming to the first grouping rule contains 64 physical sub-units, each physical unit conforming to the second grouping rule contains 128 physical sub-units, each physical unit conforming to the third grouping rule contains 256 physical sub-units, each physical unit conforming to the fourth grouping rule contains 512 physical sub-units, and each physical unit conforming to the fifth grouping rule contains 1024 physical sub-units. However, in another exemplary embodiment, more or less grouping rules can also be considered.

FIG. 7 to FIG. 12 are schematics of a search process illustrated according to an exemplary embodiment of the disclosure. In particular, in FIG. 7 to FIG. 12, the labeled values 1 to 7 shown in certain physical sub-units represent a reading order of those physical sub-unit in a search process.

Figure 7:
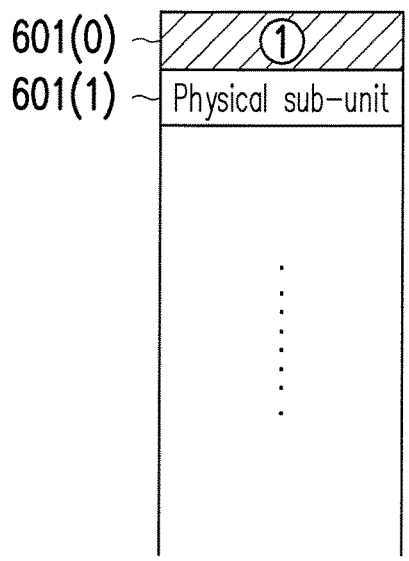
FIG. 7 to FIG. 12 are schematics of a search process illustrated according to an exemplary embodiment of the disclosure.

Referring to FIG. 7, the memory management circuit 502 first reads the data stored in the physical sub-unit 601(0) of the rewritable non-volatile memory module 406. For instance, the physical sub-unit 601(0) labeled as "1" represents that the physical sub-unit 601(0) is a physical sub-unit "first" read in the search process. In particular, the physical sub-unit 601(0) is a first physical sub-unit in the first physical unit of the rewritable non-volatile memory module 406 under each of the grouping rules.

In the present exemplary embodiment, the arrangement order of the physical unit in the rewritable non-volatile memory module 406 is determined according to the number of a certain physical unit. For instance, if a certain physical unit is assigned with a smaller number, it represents that the arrangement order of the physical unit in the rewritable non-volatile memory module 406 is prior; if a certain physical unit is assigned with a greater number, it represents that the arrangement order of the physical unit in the rewritable non-volatile memory module 406 is latter. Therefore, in the present exemplary embodiment, a first physical unit of the rewritable non-volatile memory module 406 refers to the physical unit assigned with the smallest number in the rewritable non-volatile memory module 406. For instance, in the exemplary embodiment of FIG. 6, the physical unit 602(0) is the physical unit assigned with the smallest number in the rewritable non-volatile memory module 406, and the physical unit 602(C) is the physical unit assigned with the largest number in the rewritable non-volatile memory module 406.

Similarly, in the present exemplary embodiment, the order of the physical sub-unit in a certain physical unit is determined according to the assigned number of a certain physical sub-unit. For instance, if a certain physical sub-unit is assigned with a smaller number, it represents that the arrangement order of the physical sub-unit in a physical unit to which the physical sub-unit belongs is prior, if a certain physical sub-unit is assigned with a larger number, it represents that the arrangement order of the physical sub-unit in the physical unit to which the physical sub-unit belongs is latter. Therefore, in the present exemplary embodiment, a first physical sub-unit of a certain physical unit refers to a physical sub-unit assigned with the smallest number in the physical unit, and the last physical sub-unit of a certain physical unit refers to a physical sub-unit assigned with the largest number in the physical unit. For instance, in the exemplary embodiment of FIG. 6, the physical sub-unit 601(0) is a physical sub-unit assigned with the smallest number in the physical unit 602(0), and the physical sub-unit 601(A−1) is the physical sub-unit assigned with the largest number in the physical unit 602(0).

According to the exemplary embodiment of FIG. 6, regardless of the value of A, the physical sub-unit 601(0) belongs to the physical unit 602(0) and is the physical unit assigned with the smallest number in the physical unit 602(0). In an exemplary embodiment, the physical sub-unit 601(0) is also referred to as a preset physical sub-unit. For instance, the preset physical sub-unit refers to the physical sub-unit for storing the above system information as default for replacing the ROM 507 under general conditions (such as when the memory storage apparatus 10 leaves the factory). Therefore, in a search process, reading the data stored in the preset physical sub-unit as priority results in a greater chance of obtaining the above system information. After the data stored in the physical sub-unit 601(0) is obtained, the memory management circuit 502 determines whether the above system information is obtained. If the above system information is obtained, then the memory management circuit 502 ends the search process and operates the rewritable non-volatile memory module 406 according to the system information.

In an exemplary embodiment, the physical sub-unit currently configured to store the above system information carries a preset marker. For instance, in an exemplary embodiment, one certain physical sub-unit contains a data area, a spare area, and a parity area. If the physical sub-unit stores the above system information, then the system information is stored in the data area, while the idle region stores the preset marker and the parity region is configured to store parity information such as the ECC. In another exemplary embodiment, the preset marker can also be stored in the data area or other predefined locations in the physical sub-unit, and the disclosure is not limited thereto. After data is read from a certain physical sub-unit, the memory management circuit 502 can determine whether the read data carries the preset marker. If yes, it is determined that the above system information is read. If not, then it is determined that the above system information is not read.

In an exemplary embodiment, the executed search process includes at least one checking process. For instance, the checking process for the preset physical sub-unit (i.e., physical sub-unit 601(0)) is also referred to as a preset checking process. A certain checking process other than the preset checking process can be referred to as the Mth checking process. In the Mth checking process, the memory management circuit 502 consecutively performs checking on the Nth physical sub-unit of the Mth physical unit conforming to the first grouping rule, the Nth physical sub-unit of the Mth physical unit conforming to the second grouping rule, the Nth physical sub-unit of the Mth physical unit conforming to the third grouping rule, the Nth physical sub-unit of the Mth physical unit conforming to the fourth grouping rule, and the Nth physical sub-unit of the Mth physical unit conforming to the fifth grouping rule. In particular, M and N are respectively positive integers.

If a certain checking process does not find the above system information, then the memory management circuit 502 executes the next checking process. If the checking process currently executed is the Mth checking process, then the next checking process is the (M+1)th checking process. In the (M+1)th checking process, the memory management circuit 502 consecutively performs checking on the Nth physical sub-unit of the (M+1)th physical unit conforming to the first grouping rule, the Nth physical sub-unit of the (M+1)th physical unit conforming to the second grouping rule, the Nth physical sub-unit of the (M+1)th physical unit conforming to the third grouping rule, the Nth physical sub-unit of the (M+1)th physical unit conforming to the fourth grouping rule, and the Nth physical sub-unit of the (M+1)th physical unit conforming to the fifth grouping rule.

In any checking process, the entire search process stops when the above system information is found. Moreover, in the same checking process, the checking order of the physical sub-units can be adjusted according to practical demand. In the present exemplary embodiment, N=1 is taken as an example. However, in another exemplary embodiment, N can also be set to other positive integers, as long as N less than the total number of physical sub-units contained in one physical unit under the corresponding grouping rule. For instance, in the exemplary embodiment of FIG. 7, if the preset checking process does not find the above system information, then the memory management circuit 502 executes the first checking process (i.e., M=1).

Figure 8:
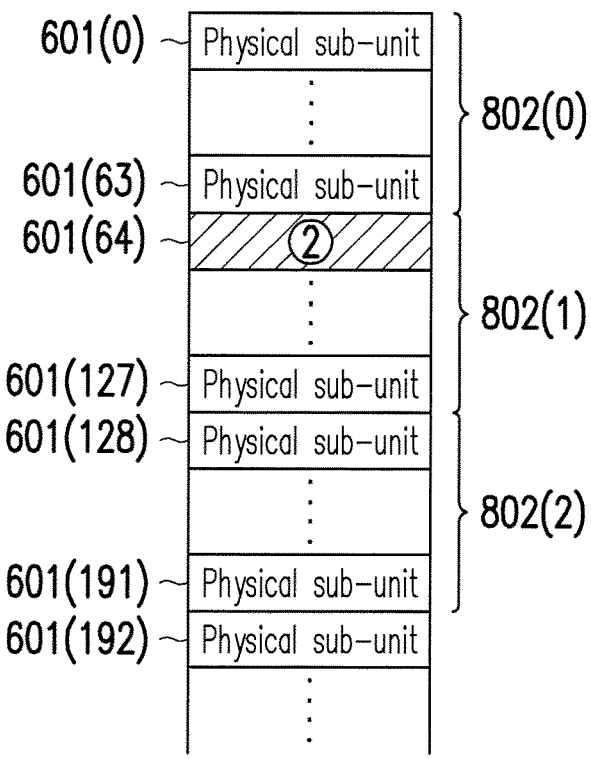

Referring to FIG. 8, a physical unit 802(0) is the first physical unit conforming to the first grouping rule, a physical unit 802(1) is the second physical unit conforming to the first grouping rule, and a physical unit 802(2) is the third physical unit conforming to the first grouping rule. In the first checking process, the memory management circuit 502 skips the physical unit 802(0) and directly reads data from the physical unit 802(1). For instance, continuing with the previously-read physical sub-unit 601(0), the memory management circuit 502 skips 63 consecutively-numbered physical sub-units regarded as belonging to the physical unit 802(0) and directly reads the data stored in the physical sub-unit 601(64). In particular, the physical sub-unit 601(64) is the first physical sub-unit of the physical unit 802(1). As shown in FIG. 8, the physical sub-unit 601(64) labeled as "2" represents that the physical sub-unit 601(64) is the "second" physical sub-unit being read in the entire search process.

Figure 9:
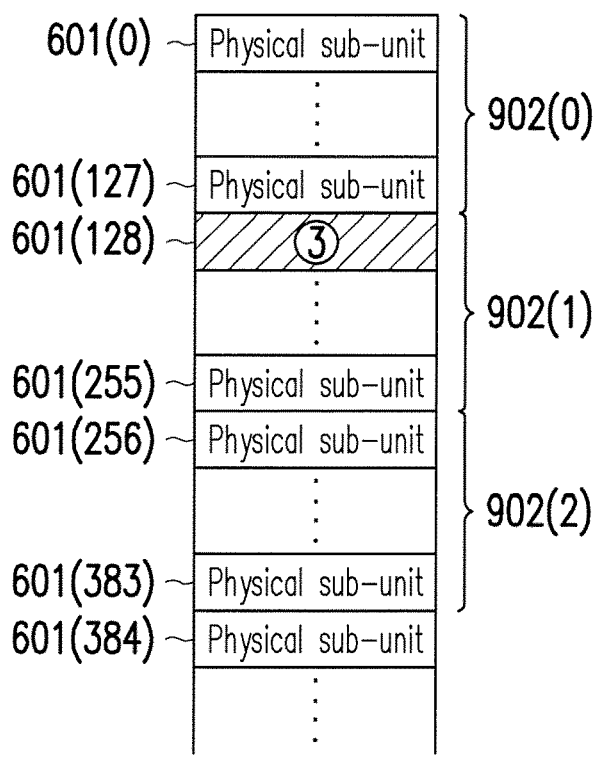

Referring to FIG. 9, a physical unit 902(0) is the first physical unit conforming to the second grouping rule, a physical unit 902(1) is the second physical unit conforming to the second grouping rule, and a physical unit 902(2) is the third physical unit conforming to the second grouping rule. In the first checking process, if the above system information cannot be obtained from the physical sub-unit 601(64), then the memory management circuit 502 skips the physical unit 902(0) and directly reads data from the physical unit 902(1). For instance, continuing with the previously-read physical sub-unit 601(64), the memory management circuit 502 skips 63 consecutively-numbered physical sub-units regarded as belonging to the physical unit 902(0) and directly reads the data stored in the physical sub-unit 601(128). In particular, the physical sub-unit 601(128) is the first physical sub-unit of the physical unit 902(1). As shown in FIG. 9, the physical sub-unit 601(128) labeled as "3" represents that the physical sub-unit 601(128) is the "third" physical sub-unit being read in the entire search process.

Figure 10:
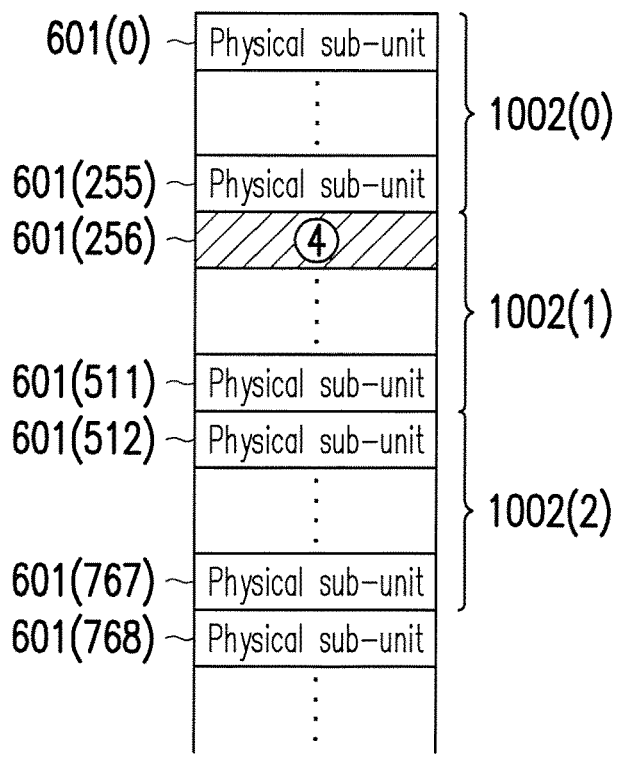

Referring to FIG. 10, a physical unit 1002(0) is the first physical unit conforming to the third grouping rule, a physical unit 1002(1) is the second physical unit conforming to the third grouping rule, and a physical unit 1002(2) is the third physical unit conforming to the third grouping rule. In the first checking process, if the above system information cannot be obtained from the physical sub-unit 601(128), then the memory management circuit 502 skips the physical unit 1002(0) and directly reads data from the physical unit 1002(1). For instance, continuing with the previously-read physical sub-unit 601(128), the memory management circuit 502 skips 127 consecutively-numbered physical sub-units regarded as belonging to the physical unit 1002(0) and directly reads the data stored in the physical sub-unit 601 (256). In particular, the physical sub-unit 601(256) is the first physical sub-unit of the physical unit 1002(1). As shown in FIG. 10, the physical sub-unit 601(256) labeled as "4" represents that the physical sub-unit 601(256) is the "fourth" physical sub-unit being read in the entire search process.

Figure 11:
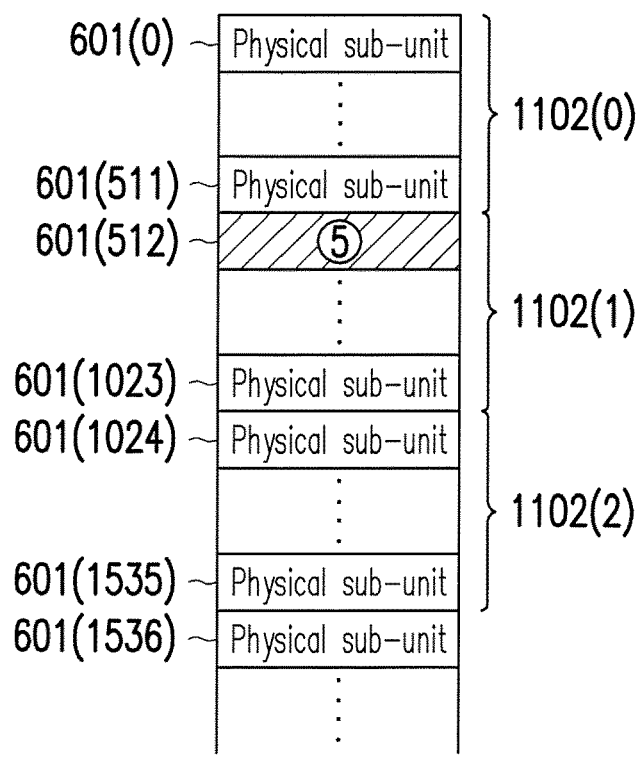

Referring to FIG. 11, a physical unit 1102(0) is the first physical unit conforming to the fourth grouping rule, a physical unit 1102(1) is the second physical unit conforming to the fourth grouping rule, and a physical unit 1102(2) is the third physical unit conforming to the fourth grouping rule. In the first checking process, if the above system information cannot be obtained from the physical sub-unit 601(256), then the memory management circuit 502 skips the physical unit 1102(0) and directly reads data from the physical unit 1102(1). For instance, continuing with the previously-read physical sub-unit 601(256), the memory management circuit 502 skips 255 consecutively-numbered physical sub-units regarded as belonging to the physical unit 1102(0) and directly reads the data stored in the physical sub-unit 601 (512). In particular, the physical sub-unit 601(512) is the first physical sub-unit of the physical unit 1102(1). As shown in FIG. 11, the physical sub-unit 601(512) labeled as "5" represents that the physical sub-unit 601(512) is the "fifth" physical sub-unit being read in the entire search process.

Figure 12:
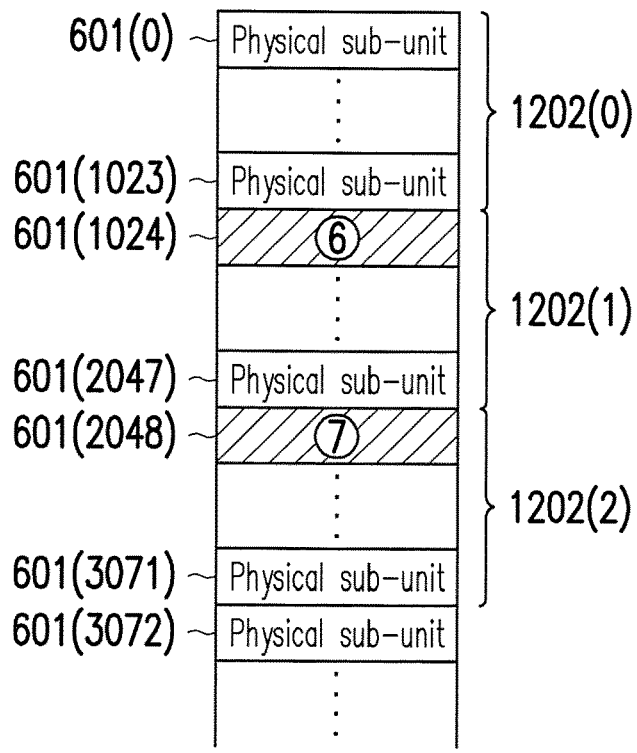

Referring to FIG. 12, a physical unit 1202(0) is the first physical unit conforming to the fifth grouping rule, a physical unit 1202(1) is the second physical unit conforming to the fifth grouping rule, and a physical unit 1202(2) is the third physical unit conforming to the fifth grouping rule. In the first checking process, if the above system information still cannot be obtained from the physical sub-unit 601(512), then the memory management circuit 502 skips the physical unit 1202(0) and directly reads data from the physical unit 1202(1). For instance, continuing with the previously-read physical sub-unit 601(512), the memory management circuit 502 skips 511 consecutively-numbered physical sub-units regarded as belonging to the physical unit 1202(0) and directly reads the data stored in the physical sub-unit 601 (1024). In particular, the physical sub-unit 601(1024) is the first physical sub-unit of the physical unit 1202(1). As shown in FIG. 12, the physical sub-unit 601(1024) labeled as "6" represents that the physical sub-unit 601(1024) is the "sixth" physical sub-unit being read in the entire search process. Similarly, if the first checking process does not find the above system information, then a next checking process (i.e., second checking process) is executed.

In an exemplary embodiment, the memory management circuit 502 records the checked physical sub-units to a checking table. For instance, in the preset checking process and the first checking process, the checked physical sub-units 601(0), 601(64), 601(128), 601(256), 601(512), and 601(1024) are marked as checked in the checking table. Accordingly, in a subsequent checking process, the physical sub-units marked as checked are skipped.

In the second checking process, it is configured in advance that the checking is performed on the individual first physical sub-units (i.e., the physical sub-units 601(128), 601(256), 601(512), 601(1024), and 601(2048)) of the physical units 802(2), 902(2), 1002(2), 1102(2), and 1202(2). However, it can be known according to the checking table that, the physical sub-units 601(128), 601(256), 601(512), and 601(1024) are checked in the first checking process. Therefore, in the second checking process, continuing with the previously-read physical sub-unit 601(1024), the memory management circuit 502 skips 1023 consecutively-numbered physical sub-units belonging to the physical unit 1202(1) and directly reads the data stored in the physical sub-unit 601(2048). In particular, the physical sub-unit 601(2048) is the first physical sub-unit of the physical unit 1202(2). For instance, as shown in FIG. 12, the physical sub-unit 601(2048) labeled as "7" represents that the physical sub-unit 601(2048) is the "seventh" physical sub-unit being read in the entire search process. Moreover, if the second checking process does not find the above system information, then the next checking process (i.e., third checking process) is executed.

In the third checking process, the memory management circuit 502 consecutively performs checking on at least one of the Nth physical sub-unit of the third physical unit conforming to the first grouping rule, the Nth physical sub-unit of the third physical unit conforming to the second grouping rule, the Nth physical sub-unit of the third physical unit conforming to the third grouping rule, the Nth physical sub-unit of the third physical unit conforming to the fourth grouping rule, and the Nth physical sub-unit of the third physical unit conforming to the fifth grouping rule with reference to the checking table. Further details of the third checking process are as described above for the first checking process and the second checking process and are not repeated herein. Moreover, more checking processes can also be executed after the third checking process until the above system information is found.

In the present exemplary embodiment, the memory management circuit 502 sends a specific read command sequence to the rewritable non-volatile memory module 406 based on a specific grouping rule to complete a specific reading operation thereof in the search process.

Figure 13:
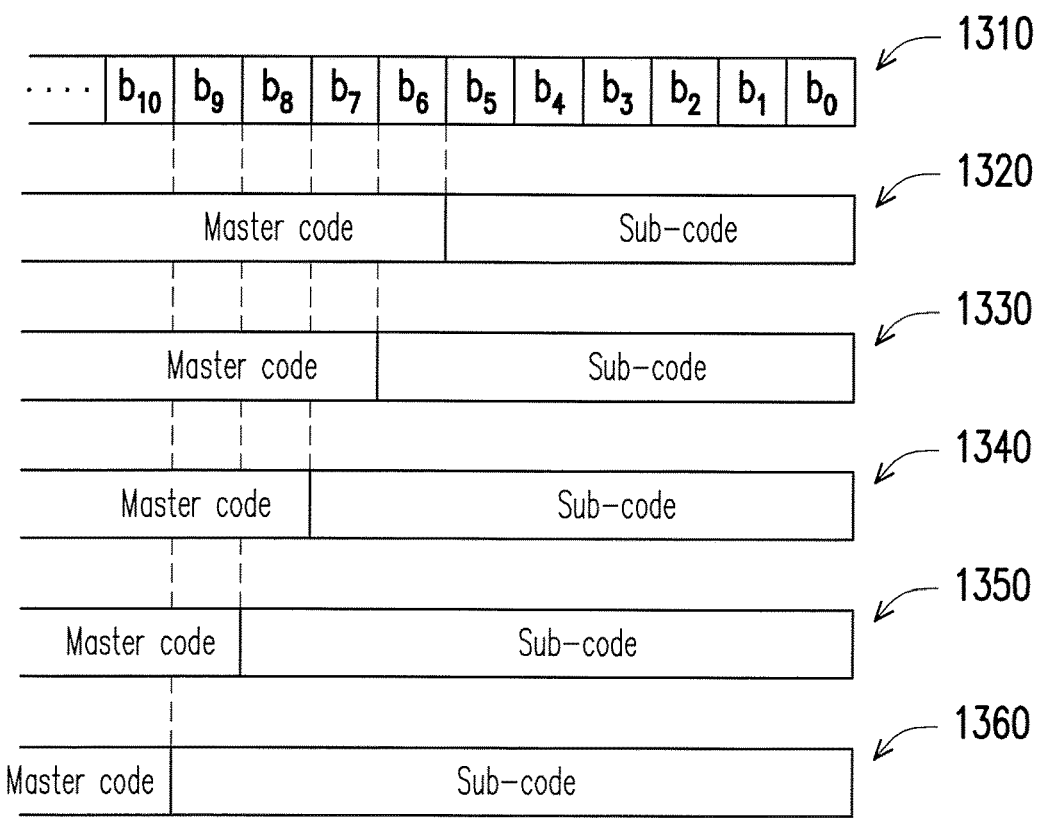
FIG. 13 is a schematic of a read command sequence illustrated according to an exemplary embodiment of the disclosure.

FIG. 13 is a schematic of a read command sequence illustrated according to an exemplary embodiment of the disclosure.

Referring to FIG. 13, one read command sequence contains at least one physical address sequence 1310. The physical address sequence 1310 at least includes bits $b_0$-$b_{10}$ and can be regarded to contain two portions of a master code and a sub-code. In particular, the master code corresponds to a certain physical unit in the rewritable non-volatile memory module 406, and the sub-code corresponds to a certain physical sub-unit of the physical unit. Alternatively, from another perspective, the combination of the master code and the sub-code directly corresponds to a certain physical sub-unit in the rewritable non-volatile memory module 406. For instance, the combination of the master code and the sub-code is the assigned number of a certain physical sub-unit.

In an exemplary embodiment, a physical address sequence 1320 is contained in the read command sequence sent based on the first grouping rule. In particular, the master code of the physical address sequence 1320 corresponds to one specific physical unit conforming to the first grouping rule, and the sub-code of the physical address sequence 1320 corresponds to one specific physical sub-unit in the specific physical unit. The physical address sequence 1330 is contained in the read command sequence sent based on the second grouping rule. In particular, the master code of the physical address sequence 1330 corresponds to one specific physical unit conforming to the second grouping rule, and the sub-code of the physical address sequence 1330 corresponds to one specific physical sub-unit in the specific physical unit. The physical address sequence 1340 is contained in the read command sequence sent based on the third grouping rule. In particular, the master code of the physical address sequence 1340 corresponds to one specific physical unit conforming to the third grouping rule, and the sub-code of the physical address sequence 1340 corresponds to one specific physical sub-unit in the specific physical unit. The physical address sequence 1350 is contained in the read command sequence sent based on the fourth grouping rule. In particular, the master code of the physical address sequence 1350 corresponds to one specific physical unit conforming to the fourth grouping rule, and the sub-code of the physical address sequence 1350 corresponds to one specific physical sub-unit in the specific physical unit. The physical address sequence 1360 is contained in the read command sequence sent based on the fifth grouping rule. In particular, the master code of the physical address sequence 1360 corresponds to one specific physical unit conforming to the fifth grouping rule, and the sub-code of the physical address sequence 1360 corresponds to one specific physical sub-unit in the specific physical unit.

Figure 14:
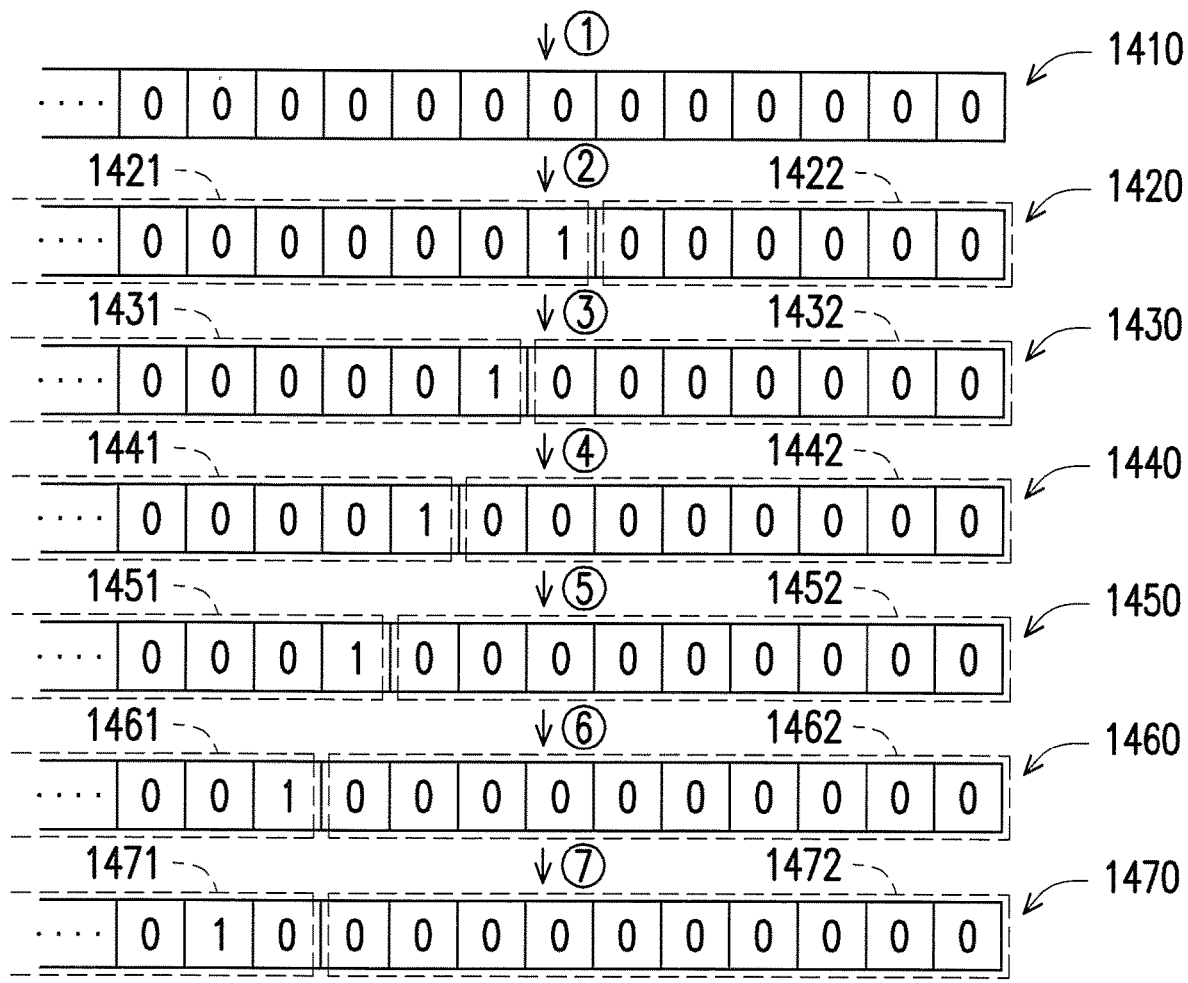
FIG. 14 is a schematic of sending a read command sequence illustrated according to an exemplary embodiment of the disclosure.

FIG. 14 is a schematic of sending a read command sequence illustrated according to an exemplary embodiment of the disclosure.

Referring to FIG. 7 and FIG. 14, in the preset checking process, the memory management circuit 502 sends a read command sequence containing a physical address sequence 1410 (also referred to as a preset read command sequence) to instruct the rewritable non-volatile memory module 406 to read data from the physical sub-unit 601(0).

Referring to FIG. 8 and FIG. 14, the memory management circuit 502 sends a read command sequence containing a physical address sequence 1420 to instruct the rewritable non-volatile memory module 406 to read data from the physical sub-unit 601(64). In particular, a master code 1421 corresponds to the physical unit 802(1), and a sub-code 1422 corresponds to the physical sub-unit 601(64) assigned with the smallest number in the physical unit 802(1).

Referring to FIG. 9 and FIG. 14, the memory management circuit 502 sends a read command sequence containing a physical address sequence 1430 to instruct the rewritable non-volatile memory module 406 to read data from the physical sub-unit 601(128). In particular, a master code 1431 corresponds to the physical unit 902(1), and a sub-code 1432 corresponds to the physical sub-unit 601(128) assigned with the smallest number in the physical unit 902(1).

Referring to FIG. 10 and FIG. 14, the memory management circuit 502 sends a read command sequence containing a physical address sequence 1440 to instruct the rewritable non-volatile memory module 406 to read data from the physical sub-unit 601(256). In particular, a master code 1441 corresponds to the physical unit 1002(1), and a sub-code 1442 corresponds to the physical sub-unit 601(256) assigned with the smallest number in the physical unit 1002(1).

Referring to FIG. 11 and FIG. 14, the memory management circuit 502 sends a read command sequence containing a physical address sequence 1450 to instruct the rewritable non-volatile memory module 406 to read data from the physical sub-unit 601(512). In particular, a master code 1451 corresponds to the physical unit 1102(1), and a sub-code 1452 corresponds to the physical sub-unit 601(512) assigned with the smallest number in the physical unit 1102(1).

Referring to FIG. 12 and FIG. 14, the memory management circuit 502 sends a read command sequence containing a physical address sequence 1460 to instruct the rewritable non-volatile memory module 406 to read data from the physical sub-unit 601(1024). In particular, a master code 1461 corresponds to the physical unit 1202(1), and a sub-code 1462 corresponds to the physical sub-unit 601(1024) assigned with the smallest number in the physical unit 1202(1). Moreover, the memory management circuit 502 sends a read command sequence containing a physical address sequence 1470 to instruct the rewritable non-volatile memory module 406 to read data from the physical sub-unit 601(2048). In particular, a master code 1471 corresponds to the physical unit 1202(2), and a sub-code 1472 corresponds to the physical sub-unit 601(2048) assigned with the smallest number in the physical unit 1202(2).

In an exemplary embodiment, in a certain checking process, it is assumed that J number of consecutively-numbered physical sub-units are configured between a certain physical sub-unit and another physical sub-unit which are consecutively read (i.e., the J number of consecutively-numbered physical sub-units are skipped), and K number of consecutively-numbered physical sub-units are configured between the another physical sub-unit and yet another physical sub-unit which are consecutively read (i.e., a K number of consecutively-numbered physical sub-units are skipped), then the value of J may be different from the value of K. For instance, in the first checking process of FIG. 8 to FIG. 10, the physical sub-unit 601(64) and the physical sub-unit 601(128) consecutively-read contain 63 consecutively-numbered physical sub-units therebetween, and the physical sub-unit 601(128) and the physical sub-unit 601(256) consecutively-read contain 127 consecutively-numbered physical sub-units therebetween.

It should be mentioned that, in other exemplary embodiments in which N is not 1, by adjusting the sub-code in the physical address sequence, the second, third, fourth . . . etc. physical sub-units in a certain physical unit conforming to a certain grouping rule can be read using the corresponding read command sequence.

Figure 15:
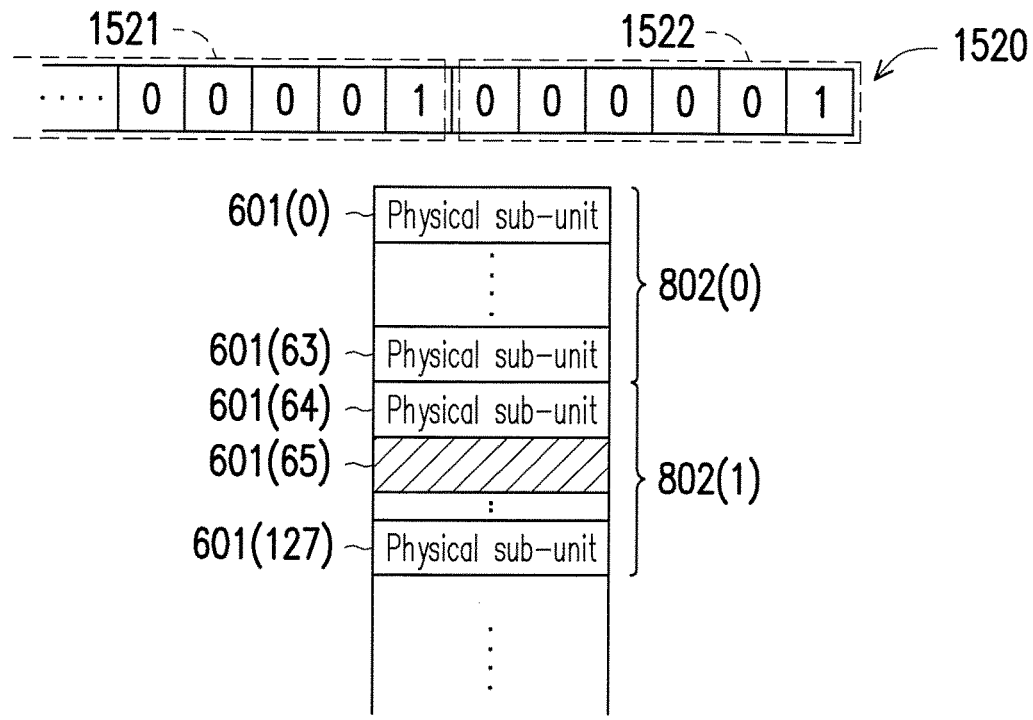
FIG. 15 and FIG. 16 are schematics of a search process illustrated according to another exemplary embodiment of the disclosure.
Figure 16:
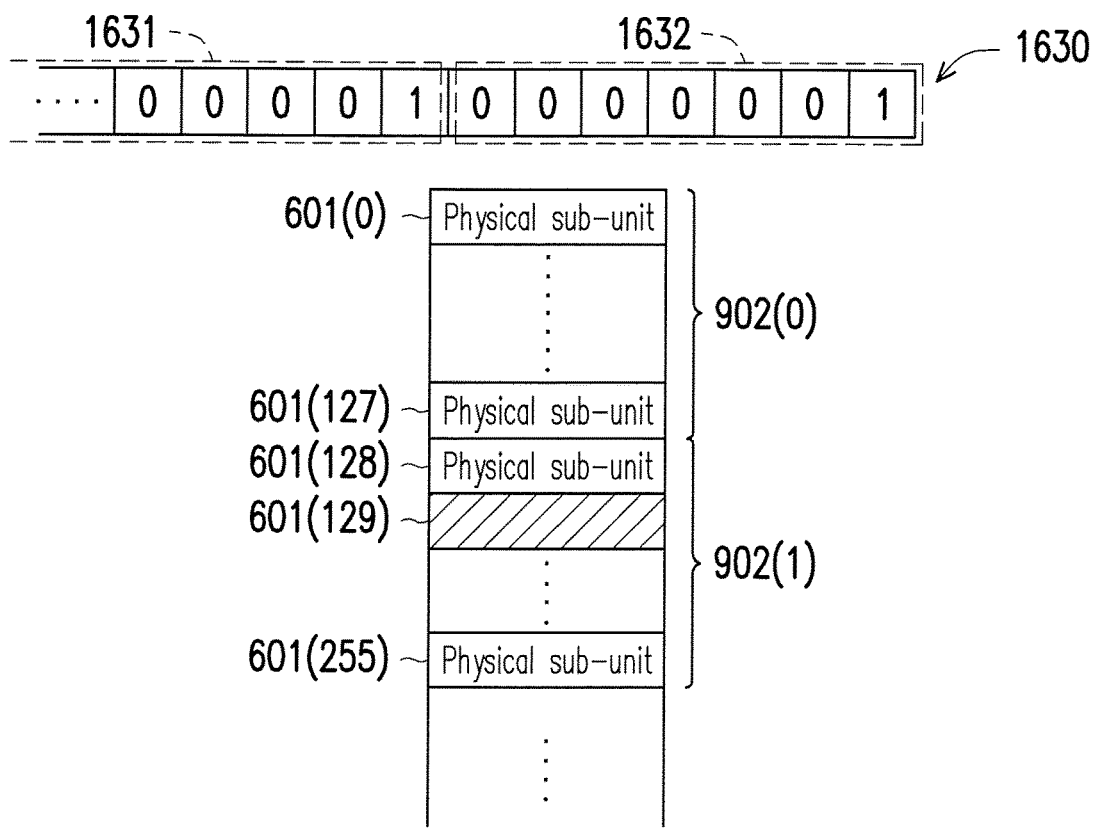

FIG. 15 and FIG. 16 are schematics of a search process illustrated according to another exemplary embodiment of the disclosure.

Referring to FIG. 15, the memory management circuit 502 can send a read command sequence containing a physical address sequence 1520 to instruct the rewritable non-volatile memory module 406 to read the physical sub-unit 601(65) in the physical unit 802(1). In particular, a master code 1521 corresponds to the physical unit 802(1), and a sub-code 1522 corresponds to the second physical sub-unit 601(65) in the physical unit 802(1).

Referring to FIG. 16, the memory management circuit 502 can also send a read command sequence containing a physical address sequence 1630 to instruct the rewritable non-volatile memory module 406 to read the physical sub-unit 601(129) in the physical unit 902(1). In particular, a master code 1631 corresponds to the physical unit 902(1), and a sub-code 1632 corresponds to the second physical sub-unit 601(129) in the physical unit 902(1).

In an exemplary embodiment, the search strategy used in the search process is checking the preset physical sub-unit first. If the above system information is not found in the preset physical sub-unit, then the first physical sub-unit in at least a portion or all of the physical units conforming to various grouping rules in the rewritable non-volatile memory module 406 is checked. If the above system information is still not found, then the second physical sub-unit in at least a portion or all of the physical units conforming to various grouping rules in the rewritable non-volatile memory module 406 is checked. Similarly, if the above system information is still not found, then the third and fourth physical sub-units . . . etc. in at least a portion or all of the physical units conforming to various grouping rules in the rewritable non-volatile memory module 406 are checked.

However, in other exemplary embodiments, the search strategy can also be different and is not limited to the above. For instance, in an exemplary embodiment, the second physical sub-unit in at least a portion or all of the physical units conforming to various grouping rules in the rewritable non-volatile memory module 406 can also be checked first; if the above system information is not found, the first physical sub-unit in at least a portion or all of the physical units conforming to various grouping rules in the rewritable non-volatile memory module 406 is checked. Alternatively, in an exemplary embodiment, the last physical sub-unit in at least a portion or all of the physical units conforming to various grouping rules in the rewritable non-volatile memory module 406 can also be checked first; if the above system information is not found, then the first or other physical sub-units in at least a portion or all of the physical units conforming to various grouping rules in the rewritable non-volatile memory module 406 is checked . . . etc.

Figure 17:
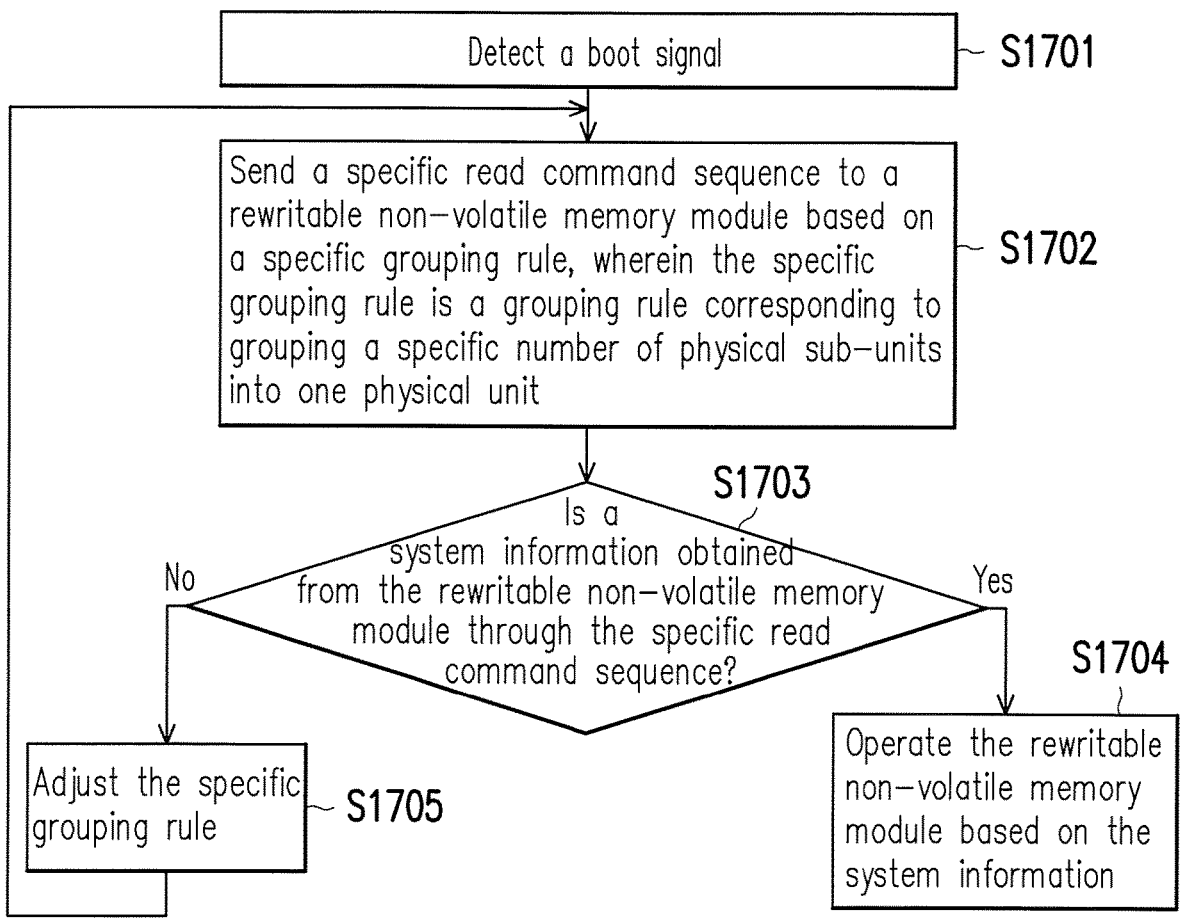
FIG. 17 is a flow chart of a data search method illustrated according to an exemplary embodiment of the disclosure.

FIG. 17 is a flow chart of a data search method illustrated according to an exemplary embodiment of the disclosure.

Referring to FIG. 17, in step S1701, a boot signal is detected. In step S1702, a specific read command sequence is sent to the rewritable non-volatile memory module based on a specific grouping rule (such as the first grouping rule), wherein the specific grouping rule is a grouping rule corresponding to grouping a specific number (such as a first number) of physical sub-units into one physical unit. In step S1703, whether system information is obtained from the rewritable non-volatile memory module through the specific read command sequence is determined. If yes, then in step S1704, the rewritable non-volatile memory module is operated based on the obtained system information. If not, then in step S1705, the specific grouping rule is adjusted. For instance, the specific grouping rule is adjusted from the first grouping rule to the second grouping rule. Then, step S1702 is repeated. For instance, in the repeated step S1702, a specific read command sequence is sent to the rewritable non-volatile memory module based on the adjusted specific grouping rule (such as the second grouping rule), wherein the adjusted specific grouping rule is a grouping rule corresponding to grouping another specific number (such as a second number) of physical sub-units into one physical unit. Then, based on the determination results of step S1703, one of step S1704 and S1705 is executed. In an exemplary embodiment, after the memory storage apparatus is booted, steps S1702, S1703, and S1705 can be repeated until step S1704 is executed.

However, each step in FIG. 17 is as described in detail above, and is not repeated herein. It should be mentioned that, each step in FIG. 17 can be implemented as a plurality of program codes or circuits, and the disclosure is not limited thereto. Moreover, the method of FIG. 17 can be used with the above exemplary embodiments, and can also be used alone, the disclosure is not limited thereto.

Based on the above, after the boot signal is detected, corresponding read command sequences can be sent in order based on different grouping rules. In particular, each of the grouping rules corresponds to a specific number of physical sub-units being grouped to the same physical unit for the management of the rewritable non-volatile memory module. For instance, the number of physical sub-units contained in one physical unit are different corresponding to different grouping rules. Therefore, the efficiency of searching for the system information from the rewritable non-volatile memory module can be increased. For instance, in an exemplary embodiment, even if the grouping rule actually used in the rewritable non-volatile memory module is one physical unit containing 1024 or more physical sub-units, the physical sub-units of a specific location in each physical unit (such as the first physical sub-unit assigned with the smallest number in each of the physical units) can also be very easily found and checked.

In an exemplary embodiment, the efficiency of searching for system information from the rewritable non-volatile memory module is increased, and therefore in the production process of the memory storage apparatus, the boot information stored in different memory control circuit units for operating the rewritable non-volatile memory modules adopting different grouping rules can be simplified, modularized, or made uniform, so as to increase the production efficiency of the memory storage apparatus. Moreover, in an exemplary embodiment, the memory control circuit unit can correspondingly operate a certain rewritable non-volatile memory module after simply updating the system information stored in the rewritable non-volatile memory module. In comparison to directly storing the system information in the ROM of the memory control circuit unit, storing the system information in the rewritable non-volatile memory module can make the usage of the memory control circuit unit more flexible.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data search method configured to access a rewritable non-volatile memory module, wherein the rewritable non-volatile memory module comprises a plurality of physical sub-units, and the data search method comprises:

detecting a boot signal;

sending a first read command sequence, for reading system information of the rewritable non-volatile memory module, which only instructs a reading of a first physical sub-unit which is an Nth physical sub-unit of a first physical unit meeting a first grouping rule, based on the first grouping rule after the boot signal is detected, wherein the first grouping rule is a grouping rule corresponding to grouping a first number of physical sub-units among the physical sub-units into one physical unit;

sending a second read command sequence, for reading the system information, which only instructs a reading of a second physical sub-unit which is the Nth physical sub-unit of a second physical unit meeting a second grouping rule, based on the second grouping rule, wherein the second grouping rule is a grouping rule corresponding to grouping a second number of physical sub-units among the physical sub-units into one physical unit, wherein the first number and the second number are different; and operating the rewritable non-volatile memory module based on the system information of the rewritable non-volatile memory module after the system information of the rewritable non-volatile memory module is read, wherein the first read command sequence and the second read command sequence are sent sequentially, so that no read command sequence is sent for reading the system information between the sending of the first read command sequence and the sending of the second read command sequence.

2. The data search method of claim 1, wherein the first read command sequence comprises a first physical address sequence, wherein the first physical address sequence comprises a first master code, wherein the first master code corresponds to the first physical unit comprising the first number of physical sub-units in the rewritable non-volatile memory module, wherein the second read command sequence comprises a second physical address sequence, wherein the second physical address sequence comprises a second master code, wherein the second master code corresponds to the second physical unit comprising the second number of physical sub-units in the rewritable non-volatile memory module.

3. The data search method of claim 2, wherein the first physical address sequence further comprises a first sub-code, wherein the first sub-code corresponds to the first physical sub-unit among the physical sub-units,
wherein the second physical address sequence further comprises a second sub-code, wherein the second sub-code corresponds to the second physical sub-unit among the physical sub-units,
wherein N is a positive integer.

4. The data search method of claim 3, wherein a total number of bits contained in the first sub-code is different from a total number of bits contained in the second sub-code.

5. The data search method of claim 1, further comprising:
sending a third read command sequence based on a third grouping rule in the case that the system information of the rewritable non-volatile memory module is not read through the second read command sequence, wherein the third grouping rule is a grouping rule corresponding to grouping a third number of physical sub-units among the physical sub-units into one physical unit,
wherein the third number is different from the first number and the second number.

6. The data search method of claim 5, wherein the first read command sequence instructs reading a data stored in the first physical sub-unit among the physical sub-units, wherein the second read command sequence instructs reading a data stored in the second physical sub-unit among the physical sub-units, wherein the third read command sequence instructs reading a data stored in a third physical sub-unit among the physical sub-units,
wherein a J number of consecutively-numbered physical sub-units are configured between the first physical sub-unit and the second physical sub-unit, wherein a K number of consecutively-numbered physical sub-units are configured between the second physical sub-unit and the third physical sub-unit,
wherein J and K are both positive integers, and J is not equal to K.

7. The data search method of claim 1, further comprising:
sending a preset read command sequence after the boot signal is received, wherein the preset read command sequence instructs reading a data stored in a preset physical sub-unit among the physical sub-units, wherein the preset physical sub-unit is a physical sub-unit assigned with a smallest number among the physical sub-units,
wherein the step of sending the first read command sequence is executed after the system information of the rewritable non-volatile memory module is determined as not being read through the preset read command sequence.

8. A memory storage apparatus, comprising:
a connection interface unit configured to be coupled to a host system;
a rewritable non-volatile memory module comprising a plurality of physical sub-units; and
a memory control circuit unit coupled to the connection interface unit and the rewritable non-volatile memory module,
wherein the memory control circuit unit is configured to detect a boot signal,
wherein the memory control circuit unit is further configured to send a first read command sequence, for reading system information of the rewritable non-volatile memory module, which only instructs a reading of a first physical sub-unit which is an Nth physical sub-unit of a first physical unit meeting a first grouping rule, based on the first grouping rule after the boot signal is detected, wherein the first grouping rule is a grouping rule corresponding to grouping a first number of physical sub-units among the physical sub-units into one physical unit,
wherein the memory control circuit unit is further configured to send a second read command sequence, for reading the system information, which only instructs a reading of a second physical sub-unit which is the Nth physical sub-unit of a second physical unit meeting a second grouping rule, based on the second grouping rule, wherein the second grouping rule is a grouping rule corresponding to grouping a second number of physical sub-units among the physical sub-units into one physical unit, wherein the first number is different from the second number,
wherein the memory control circuit unit is further configured to operate the rewritable non-volatile memory module based on the system information of the rewritable non-volatile memory module after the system information of the rewritable non-volatile memory module is read,
wherein the first read command sequence and the second read command are sent sequentially, so that no read command sequence is sent for reading the system information between the sending of the first read command sequence and the sending of the second read command sequence.

9. The memory storage apparatus of claim 8, wherein the first read command sequence comprises a first physical address sequence, wherein the first physical address sequence comprises a first master code, wherein the first master code corresponds to the first physical unit comprising the first number of physical sub-units in the rewritable non-volatile memory module,
wherein the second read command sequence comprises a second physical address sequence, wherein the second physical address sequence comprises a second master code, wherein the second master code corresponds to the second physical unit comprising the second number of physical sub-units in the rewritable non-volatile memory module.

10. The memory storage apparatus of claim 9, wherein the first physical address sequence further comprises a first sub-code, wherein the first sub-code corresponds to the first physical sub-unit among the physical sub-units,
wherein the second physical address sequence further comprises a second sub-code, wherein the second sub-code corresponds to the second physical sub-unit among the physical sub-units,
wherein N is a positive integer.

11. The memory storage apparatus of claim 10, wherein a total number of bits contained in the first sub-code is different from a total number of bits contained in the second sub-code.

12. The memory storage apparatus of claim 8, wherein the memory control circuit unit is further configured to send a third read command sequence based on a third grouping rule in the case that the system information of the rewritable non-volatile memory module is not read through the second read command sequence, wherein the third grouping rule is a grouping rule corresponding to grouping a third number of physical sub-units among the physical sub-units into one physical unit,
    wherein the third number is different from the first number and the second number.

13. The memory storage apparatus of claim 12, wherein the first read command sequence instructs reading a data stored in the first physical sub-unit among the physical sub-units, wherein the second read command sequence instructs reading a data stored in the second physical sub-unit among the physical sub-units, wherein the third read command sequence instructs reading a data stored in a third physical sub-unit among the physical sub-units,
    wherein a J number of consecutively-numbered physical sub-units are configured between the first physical sub-unit and the second physical sub-unit, wherein a K number of consecutively-numbered physical sub-units are configured between the second physical sub-unit and the third physical sub-unit,
    wherein J and K are both positive integers, and J is not equal to K.

14. The memory storage apparatus of claim 8, wherein the memory control circuit unit is further configured to send a preset read command sequence after the boot signal is received, wherein the preset read command sequence instructs reading a data stored in a preset physical sub-unit among the physical sub-units, wherein the preset physical sub-unit is a physical sub-unit assigned with a smallest number among the physical sub-units,
    wherein the operation of the memory control circuit unit sending the first read command sequence is executed after the system information of the rewritable non-volatile memory module is determined as not being read through the preset read command sequence.

15. A memory control circuit unit configured to control a rewritable non-volatile memory module, the memory control circuit unit comprising:
    a host interface configured to be coupled to a host system;
    a memory interface configured to be coupled to the rewritable non-volatile memory module, wherein the rewritable non-volatile memory module comprises a plurality of physical sub-units; and
    a memory management circuit coupled to the host interface and the memory interface,
    wherein the memory management circuit is configured to detect a boot signal,
    wherein the memory management circuit is further configured to send a first read command sequence, for reading system information of the rewritable non-volatile memory module, which only instructs a reading of a first physical sub-unit which is an Nth physical sub-unit of a first physical unit meeting a first grouping rule, based on the first grouping rule after the boot signal is detected, wherein the first grouping rule is a grouping rule corresponding to grouping a first number of physical sub-units among the physical sub-units into one physical unit,
    wherein the memory management circuit is further configured to send a second read command sequence, for reading the system information, which only instructs a reading of a second physical sub-unit which is the Nth physical sub-unit of a second physical unit meeting a second grouping rule, based on the second grouping rule, wherein the second grouping rule is a grouping rule corresponding to grouping a second number of physical sub-units among the physical sub-units into one physical unit, wherein the first number is different from the second number,
    wherein the memory management circuit is further configured to operate the rewritable non-volatile memory module based on the system information of the rewritable non-volatile memory module after the system information of the rewritable non-volatile memory module is read,
    wherein the first read command sequence and the second read command are sent sequentially, so that no read command sequence is sent for reading the system information between the sending of the first read command sequence and the sending of the second read command sequence.

16. The memory control circuit unit of claim 15, wherein the first read command sequence comprises a first physical address sequence, wherein the first physical address sequence comprises a first master code, wherein the first master code corresponds to the first physical unit comprising the first number of physical sub-units in the rewritable non-volatile memory module,
    wherein the second read command sequence comprises a second physical address sequence, wherein the second physical address sequence comprises a second master code, wherein the second master code corresponds to the second physical unit comprising the second number of physical sub-units in the rewritable non-volatile memory module.

17. The memory control circuit unit of claim 16, wherein the first physical address sequence further comprises a first sub-code, wherein the first sub-code corresponds to the first physical sub-unit among the physical sub-units,
    wherein the second physical address sequence further comprises a second sub-code, wherein the second sub-code corresponds to the second physical sub-unit among the physical sub-units,
    wherein N is a positive integer.

18. The memory control circuit unit of claim 17, wherein a total number of bits contained in the first sub-code is different from a total number of bits contained in the second sub-code.

19. The memory control circuit unit of claim 15, wherein the memory management circuit is further configured to send a third read command sequence based on a third grouping rule in the case that the system information of the rewritable non-volatile memory module is not read through the second read command sequence, wherein the third grouping rule is a grouping rule corresponding to grouping a third number of physical sub-units among the physical sub-units into one physical unit,
    wherein the third number is different from the first number and the second number.

20. The memory control circuit unit of claim 19, wherein the first read command sequence instructs reading a data stored in the first physical sub-unit among the physical sub-units, wherein the second read command sequence instructs reading a data stored in the second physical sub-unit among the physical sub-units, wherein the third read command sequence instructs reading a data stored in a third physical sub-unit among the physical sub-units,
    wherein a J number of consecutively-numbered physical sub-units are configured between the first physical sub-unit and the second physical sub-unit, wherein a K number of consecutively-numbered physical sub-units are configured between the second physical sub-unit and the third physical sub-unit, wherein J and K are both positive integers, and J is not equal to K.

21. The memory control circuit unit of claim 15, wherein the memory management circuit is further configured to send a preset read command sequence after the boot signal is received, wherein the preset read command sequence instructs reading a data stored in a preset physical sub-unit among the physical sub-units, wherein the preset physical sub-unit is a physical sub-unit assigned with a smallest number among the physical sub-units,
   wherein the operation of the memory management circuit sending the first read command sequence is executed after the system information of the rewritable non-volatile memory module is determined as not being read through the preset read command sequence.

* * * * *